United States Patent [19]
Theobald

[11] Patent Number: 5,925,942
[45] Date of Patent: Jul. 20, 1999

[54] POWER SUPPLY CONTROL APPARATUS AND METHOD SUITABLE FOR USE IN AN ELECTRONIC DEVICE

[75] Inventor: David J. Theobald, Woodstock, Ill.

[73] Assignee: Motorola, Inc., Schaumburg, Ill.

[21] Appl. No.: 08/895,390

[22] Filed: Jul. 16, 1997

[51] Int. Cl.[6] .................................................. H02J 7/00
[52] U.S. Cl. ........................... 307/125; 307/66; 455/573; 320/137
[58] Field of Search ................................ 307/125, 64, 66; 455/90, 573; 320/106, 110, 137

[56] References Cited

U.S. PATENT DOCUMENTS

| | | | |
|---|---|---|---|
| 4,843,299 | 6/1989 | Hutchings | 320/31 |
| 5,237,257 | 8/1993 | Johnson et al. | 320/2 |
| 5,254,931 | 10/1993 | Martensson | 320/22 |
| 5,313,661 | 5/1994 | Malmi et al. | |
| 5,315,228 | 5/1994 | Hess et al. | 320/31 |
| 5,333,176 | 7/1994 | Burke et al. | 455/573 |
| 5,418,445 | 5/1995 | Alpert et al. | 307/66 |
| 5,506,490 | 4/1996 | DeMuro | 320/106 |
| 5,519,303 | 5/1996 | Goedken et al. | 320/35 |
| 5,668,462 | 9/1997 | Hansson | 320/110 |
| 5,764,026 | 6/1998 | Issa | 320/137 |

FOREIGN PATENT DOCUMENTS 2 239 567  7/1991  United Kingdom .

OTHER PUBLICATIONS

Johnson et al., "Battery Charger Charging Time Control", U.S.S.N. 08/718,797, filed Sep. 24, 1996, Atty. Docket CE01931R.

Theobald, "Battery Identification Apparatus and Associated Method", U.S.S.N. 08/572,837, filed Dec. 14, 1995, Atty. Docket CE01032R.

Alberth Jr. et al., "Electronic Device Having Internal Charge Regulator and Temperature Sensor for Controlling Application of a Charging Current Thereto . . . ", filed Sep. 13, 1993, U.S.S.N. 08/120,509, Atty. Docket CE00861R.

Motorola Product List Web Page, Motorola Original Adapters, Personal Cellular Phone Adapters, p. 1, 1997.

Motorola Product List Web Page, Motorola Original Hands Free Systems, Personal Cellular Phone Hands Free Solutions, p. 1, 1997.

Motorola Product List Web Page, Motorola Original Chargers, Personal Cellular Phone Chargers, pp. 1& 2, 1997.

*Primary Examiner*—Albert W. Paladini
*Attorney, Agent, or Firm*—Mark D. Patrick

[57] ABSTRACT

A power supply control apparatus (113) for an electronic device (102) includes a terminal (115) to couple to a battery (103), a connector (122) to couple to an external power supply (172), a switch circuit (140) coupled to the terminal (115) and the connector (122), and a controller (108) coupled to the switch circuit (140). The switch circuit (140) connects the terminal (115) to power the electronic device (102) from the terminal (115) when the battery (103) is attached and disconnects the terminal (115) to power the electronic device (102) from the connector (122) when the external power supply (172) is attached. The controller (108) selectively controls the switch circuit (140) to connect the connector (122) to the terminal (115) so as to charge the battery (103) from the external power supply (172).

20 Claims, 2 Drawing Sheets

POWER SUPPLY CONTROL APPARATUS AND METHOD SUITABLE FOR USE IN AN ELECTRONIC DEVICE

FIELD OF THE INVENTION

This invention relates generally to electronic devices and, more particularly, to an apparatus and method used by an electronic device for controlling power supplied thereto.

BACKGROUND OF THE INVENTION

Electronic devices, such as cellular telephones, must be supplied with power in order to operate. A detachable battery is used to supply power to the device, particularly when portability of the device is desired. The battery is secured to the device via a battery connector. The battery supplies power to the device until depletion occurs. Once depleted, the battery must be replaced or recharged if portable operation of the device is to continue. If no replacement battery is available and portability is not a concern, operation of the device may be continued by attaching an accessory to the device.

Accessories are attached to the device via an accessory connector of the device, such as the standardized eight pin J3-type accessory connector used in MicroTAC™ cellular telephones manufactured and sold by Motorola, Inc. from 1989 to the present. The J3-type accessory connector has an external power supply pin; an audio in pin; an audio out pin; data pins for high speed data communications according to the three-wire bus protocol used in radiotelephone products by Motorola, Inc.; and two grounding pins in a predetermined arrangement. To be compatible with the J3-type accessory connector, an accessory must have a connector that is designed to mate with the accessory connector and have the same number and arrangement of pins. Upon attachment of the accessory to the device, the battery is electrically disconnected by an internal switch arrangement employed by the device and the device is powered solely by the accessory, which couples power transformed from an automobile electrical system or a conventional wall socket to the external power supply pin.

Unfortunately, because the battery is disconnected upon attachment of the accessory, charging of the battery can not be accomplished via the accessory connector as described. In the past, charging of the battery was performed by detaching the battery from the battery connector of the device and placing it in a standalone charger or by providing a dedicated charger connector on the device separate from, and in addition to, the accessory connector and the battery connector that fed a current source circuit disposed in the device. The standalone charger lacked portability, while the dedicated charger connector and current source circuit added cost and complexity to the device. Therefore, what is needed is a low cost apparatus and method that permits charging of the battery by the device and maintains backward compatibility with past accessories that mate with the accessory connector of the device.

DETAILED DESCRIPTION OF THE PREFERRED EMBODIMENTS

A power supply control apparatus for an electronic device includes a terminal to couple to a battery, a connector to couple to an external power supply, a switch circuit coupled to the terminal and the connector, and a controller coupled to the switch circuit. The switch circuit connects the terminal to power the electronic device from the terminal when the battery is attached and disconnects the terminal to power the electronic device from the connector when the external power supply is attached. The controller selectively controls the switch circuit to connect the connector to the terminal so as to charge the battery from the external power supply. By using the external power supply, previously used only to power the electronic device, to also charge the battery, a low cost and backwards compatible charging system is realized.

Figure 1:
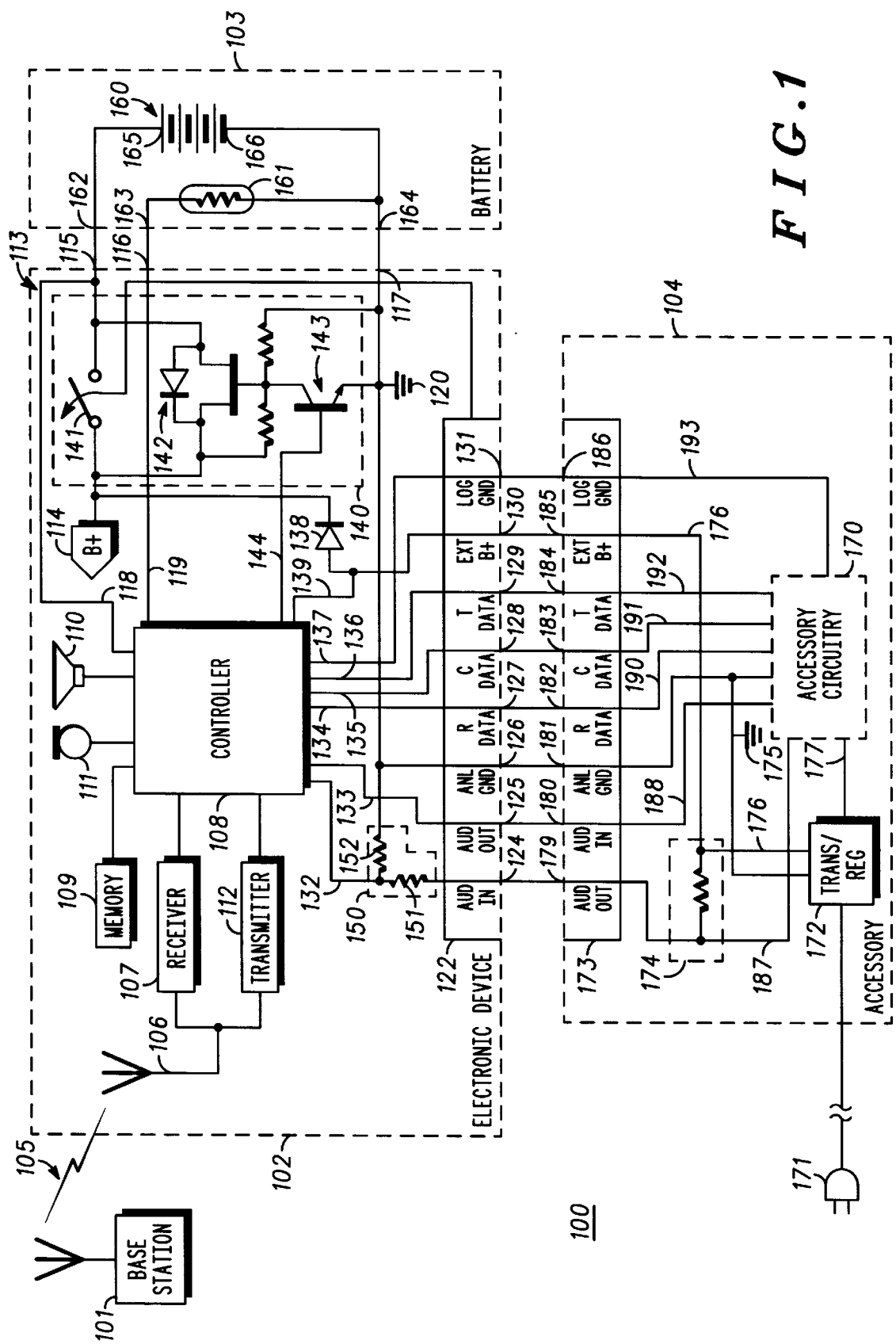
FIG. 1 illustrates, in partial block and partial schematical diagram form, a charging system including an electronic device having a power supply control apparatus, a battery, and an accessory.

FIG. 1 illustrates a charging system 100. The charging system 100 includes an electronic device 102, a battery 103, and an accessory 104. The electronic device 102 communicates with a base station 101, which provides wireless communications and features, such as paging, telephone, and short messaging, or the like, to the electronic device 102 when it is located within a geographic area served by the base station 101. The base station 101 and the electronic device 102 communicate with each other via a communication link, which is preferably radio frequency (RF) signals 105. In the illustrated embodiment, the electronic device 102 is a cellular telephone and the base station 101 is a cellular telephone service provider.

The electronic device 102 includes an antenna 106, a receiver 107, a controller 108, a memory 109, a speaker 110, a microphone 111, and a transmitter 112. The controller 108 includes a microprocessor, such as a 68HC11 microprocessor commercially available from Motorola, Inc., known synthesizer circuitry, and known audio logic circuitry. The controller 108 controls the operation of the electronic device 102 according to instructions read from the memory 109. The antenna 106 detects and emits the RF signals 105. The receiver 107 operates under control of the controller 108 to convert signals received by the antenna 106 into data signals input to the controller 108 for use thereby and into voice signals input to the controller 108 for output by the speaker 110 as audible speech. The transmitter 112 operates under control of the controller 108 to convert signals, which include data signals generated by the controller 108 and voice signals generated by the controller 108 from audible speech input via the microphone 111, for emission by the antenna 106.

The electronic device 102 has a power supply control apparatus 113 that includes, aside from the controller 108, a supply terminal (B+) 114, battery terminals 115, 116, and 117, a connector 122, and a switch circuit 140. The supply terminal 114 supplies power to electrical circuitry of the electronic device 102, including but not limited to, the receiver 107, the controller 108, and transmitter 112 via electrical connections (not shown).

The battery terminals 115–117 are for electrically connecting to the battery 103. Battery terminals 115 and 116 are monitored by the controller 108 via lines 118 and 119. Battery terminal 117 is coupled to an analog ground 120 of the electronic device 102.

The connector 122 is for physically and electrically connecting to the accessory 104. The connector 122 has multiple pins including information pins 124, 125, 127, 128, and 129 designated AUD IN, AUD OUT, and R, C, and T DATA, respectively; grounding pins 126 and 131 designated ANL GND and LOG GND; and an external power supply pin 130 designated EXT B+. The information pin 124 is coupled to the controller 108 via audio in line 132 and an identification network 150. The identification network 150 is employed to identify the accessory 104. In the illustrated embodiment, the identification network 150 includes a resistor 151, having a value of 15 kΩ, coupled in series with the information pin 124 and the audio in line 132 and a resistor 152, having a value of 15 kΩ, coupled to the audio in line 132 and the analog ground 120 in a shunt configuration, which give the identification network 150 an impedance of approximately 30 kΩ looking in from the information pin 124. The information pin 125 is coupled to the controller 108 via audio out line 133. The information pins 127–129 are coupled to the controller 108 via data lines 134–136. The grounding pins 126 and 131 are coupled to the analog ground 120 and to a logic ground of the controller 108 via line 137, respectively. The external power supply pin 130 is coupled to the supply terminal 114 via a diode 138. The external power supply pin 130 is monitored by the controller 108 via line 139. The connector 122 is preferably the standardized eight pin J3-type accessory connector employed by MicroTAC™ cellular telephones manufactured and sold by Motorola, Inc. from 1989 to the present, but may be any other suitable multiple pin accessory connector having an external power supply pin and at least one information pin.

The switch circuit 140 selectively connects the battery terminal 115 to the supply terminal 114. The switch circuit 140 includes a mechanical switch 141, a transistor switch 142, and a control switch 143. The mechanical switch 141 is coupled to the connector 122, the supply terminal 114, and the battery terminal 115. The mechanical switch 141 electrically connects the supply and battery terminals 114 and 115 when the connector 122 is unattached and opens to electrically disconnect the supply and battery terminals 114 and 115 when the accessory 104 is physically attached to the connector 122.

The transistor switch 142 is coupled in parallel with the mechanical switch 141 to prevent interruption of power to the electronic device 102 when the mechanical switch 141 is opened or closed. The transistor switch 142 provides a conduction path between the supply and battery terminals 114 and 115 until a voltage level at the supply terminal 114 meets or exceeds a voltage level at the battery terminal 115 causing the transistor switch 142 to turn off. The transistor switch 142 is preferably a MOSFET (metal-oxide semiconductor field effect transistor) having gate and drain terminals coupled to the supply terminal 114, a source terminal coupled to battery terminal 115, and an intrinsic diode coupled across the source and drain terminals. One skilled in the art will recognize that the mechanical switch 141 in the aforementioned arrangement is redundant and the desired switching of the supply and battery terminals 114 and 115 can be accomplished using only the transistor switch 142.

The control switch 143 is coupled to the transistor switch 142 and the controller 108 via line 144 to selectively control the transistor switch 142. In response to an enable signal on line 144, the control switch 143 turns on and pulls the gate of the transistor switch 142 low, which in turn forces the transistor switch 142 to turn on and provide a current conduction path between the supply and battery terminals 114 and 115. The control switch 143 is preferably a BJT (bipolar junction transistor) having a collector terminal coupled to the gate of the transistor switch 142, a base coupled to the controller 108 via line 144, and an emitter coupled to the analog ground 120.

Although electronic device 102 is illustrated as a cellular telephone, the present invention will also find application in radios, portable computers, cordless telephones, two-way radios, pagers, personal digital assistants, tape recorders, and the like, and "electronic device" as used herein shall refer to all such battery powered electronic devices and their equivalents.

The battery 103 includes an electrochemical cell 160, a thermistor 161, and contacts 162–164. The electrochemical cell 160 includes a positive polarity terminal 165 coupled to contact 162 and a negative polarity terminal 166 coupled to contact 164. The electrochemical cell 160 is preferably rechargeable, and can be, for example, any one of the following chemical types: Nickel-Cadmium (NiCd), Nickel-Metal Hydride (NiMH), Alkaline, or Lithium Ion. In the illustrated embodiment, the electrochemical cell 160 supplies a battery voltage supply, preferably of 6 V DC (direct current), at the positive polarity terminal 165. The thermistor 161 is coupled to the contacts 163 and 164. A voltage level across the thermistor 161 forms a temperature signal corresponding to the temperature of the electrochemical cell 160.

The accessory 104 has a plug 171, a transformer and regulator 172, a connector 173, and an identification element 174. The accessory 104 can be a modem, a hands-free car kit, a battery saver, or the like, and include accessory circuitry 170. The accessory circuitry 170 can include a microprocessor requiring a logic ground; and data or audio input/output devices such as a keypad, a microphone, or a speaker requiring a connection to an analog ground 175 of the accessory 104. However, in the illustrated embodiment, the accessory 104 is a low cost mid rate charger or fast rate charger that does not include the accessory circuitry 170.

The plug 171 is compatible to mate with a conventional wall outlet (not shown) and provide external power (e.g., 110 V AC (alternating current) supply) to the accessory 104 from the outlet. Alternatively, the plug 171 could be compatible to mate with a cigarette lighter port to provide power to the accessory 104 from an automobile electrical system, or with another suitable power supply.

The transformer and regulator 172 is coupled to the plug 171 and has conventional circuitry. The transformer and regulator 172 provides an external power supply to connector 173 via line 176. In the illustrated embodiment, the external power supply is a current limited constant voltage supply supplying an 8.6 V DC output voltage for both the mid and fast rate chargers, a 340 mA current for the mid rate charger, and a 850 mA current for the fast rate charger. The transformer and regulator 172 preferably includes a tracking circuit that adjusts output power according to feedback received on line 176. In the event that the accessory 104 has the accessory circuitry 170, the transformer and regulator 172 outputs regulated power on line 177 to power the accessory circuitry 170. The transformer and regulator 172 is coupled to the analog ground 175.

The connector 173 is for physically and electrically connecting to the connector 122 of the electronic device 102. The connector 173 has multiple pins including information pins 179, 180, 182, 183, and 184 designated AUD OUT, AUD IN, and R, C, and T DATA, respectively; grounding pins 181 and 186 designated ANL GND and LOG GND; and an external power supply pin 185 designated EXT B+. The information pins 179 and 180 are coupled to an audio out line 187 and an audio in line 188, respectively. The information pins 181–183 are coupled to data lines 190–192. The grounding pins 181 and 186 are coupled to the analog ground 175 and logic ground line 193, respectively. The external power supply pin 185 is coupled to the transformer and regulator 172 via line 176.

The identification element 174 is employed to identify the accessory 104 to the electronic device 102. The identification element 174 has two ends, one end coupled to line 176 and the other end coupled to the audio out line 187. The identification element 174 is selected to have a different electrical value for each different type of the accessory 104. For example, in the illustrated embodiment, the identification element 174 employed in the mid rate charger accessory is a 120 kΩ resistor, and the identification element 174 employed in the fast rate charger accessory is a 36 kΩ resistor.

Figure 2:
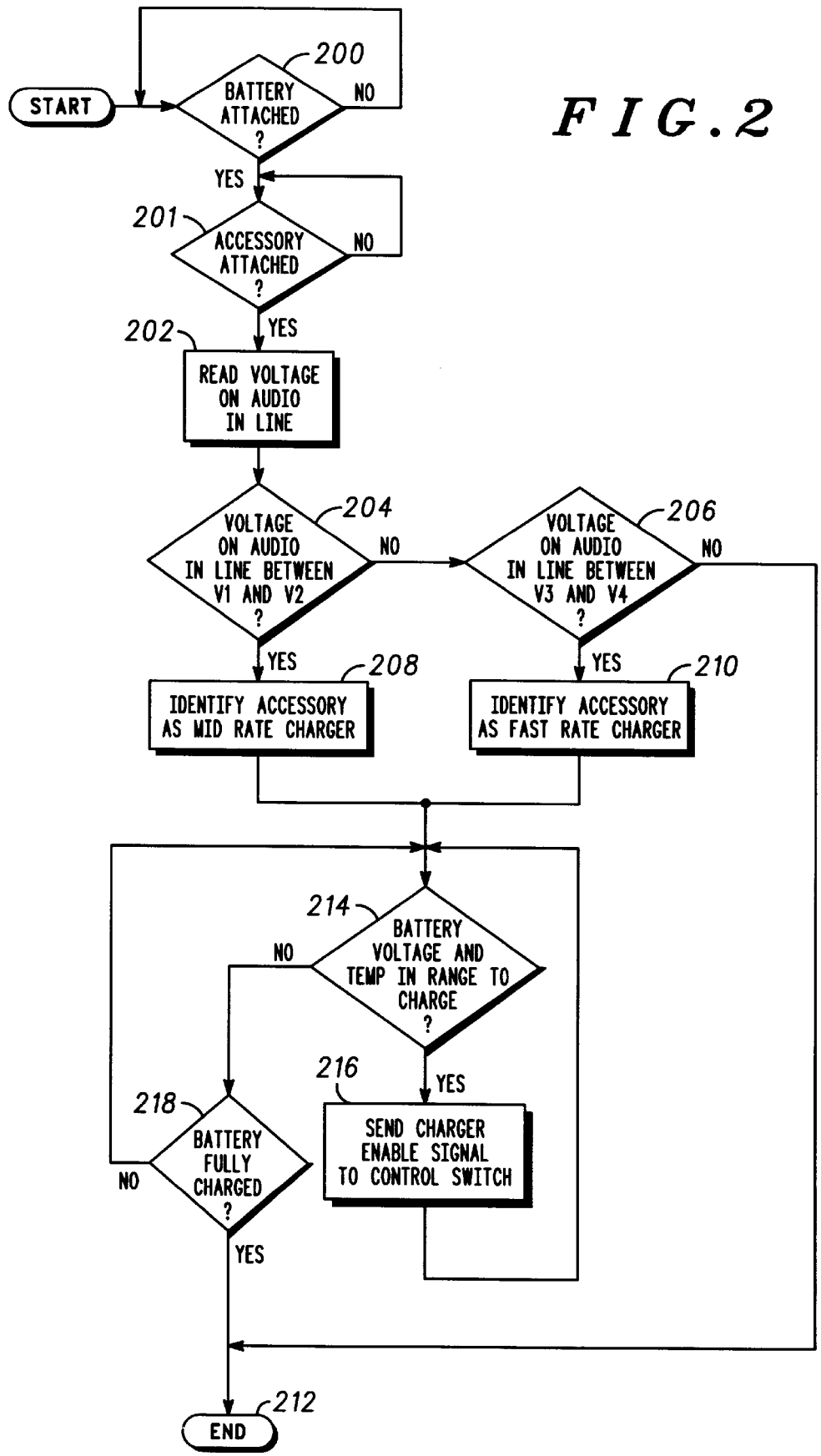
FIG. 2 illustrates, in flow chart form, a power supply control method implemented by the electronic device of FIG. 1.

The charging system 100 operates according to a power supply control method shown in FIG. 2. Steps of the method of FIG. 2 are stored in the memory 109 of FIG. 1 as instructions, which are executed by the controller 108 in the following manner.

Referring to FIGS. 1 and 2, the controller 108 waits until the battery 103 is attached to the electronic device 102 (at step 200). The battery 103 is attached to the electronic device 102 when the contacts 162–164 of the battery 103 are physically mated with, and electrically connected to, the battery terminals 115–117, respectively. Upon attachment of the battery 103, the positive polarity terminal 165 of the electrochemical cell 160 is electrically connected to the supply terminal 114 and the electronic device 102 is powered by the battery voltage supply. The controller 108 detects attachment of the battery 103 from the presence of the battery voltage supply on line 118. The diode 138 prevents the power supplied by the battery 103 from draining out the connector 122. The electronic device 102 is powered from the battery 103 until it discharges to a voltage level that is insufficient to operate electronic device 102.

Next, the controller 108 waits until the accessory 104 is attached to the electronic device 102 (at step 201). The accessory 104 is attached to the electronic device 102 when the connectors 173 and 122 are physically mated so that the pins 179–186 and 124–131, respectively, are held in electrical contact. The mechanical switch 141 of the switch circuit 140 opens upon physical mating of the connectors 122 and 173. The transistor switch 142 of the switch circuit 140 turns off when the external power supply is supplied to the supply terminal 114 from the transformer and regulator 172 via the path of line 176, the pins 185 and 130, and the diode 138. The transistor switch 142 turns off because, in the illustrated embodiment, the voltage level of the external power supply at the supply terminal 114 is approximately 7.8 V after passing through the diode 138, which exceeds the battery supply voltage of approximately 6 V at the battery terminal 115. The controller 108 senses attachment of the accessory 104 from the presence of the external power supply on line 139. Once the mechanical switch 141 is open and the transistor switch 142 is off, the electrochemical cell 160 of the battery 103 is disconnected from the supply terminal 114 and the electronic device 102 is powered by the external power supply of the accessory 104.

Also upon attachment of the accessory 104, the identification element 174 of the accessory 104 is electrically connected to the identification network 150 of the electronic device 102 via the pins 179 and 124, and the analog grounds 175 and 120 are intercoupled via pins 181 and 126. The external supply voltage of the accessory 104, which is coupled to the identification element 174 via line 176, drives the identification element 174 and the identification network 150 to generate a voltage level on the audio in line 132 of the electronic device 102. In the illustrated embodiment, a voltage level of approximately 1.72 V is generated on the audio in line 132 when the mid rate charger accessory is attached and a voltage level of approximately 3.91 V is generated on the audio in line 132 when the fast rate charger accessory is attached. If the accessory 104 has the accessory circuitry 170, audio is communicated between the accessory circuitry 170 and the controller 108 via the path of audio out line 187-pin 179-pin 124-audio in line 132 and the path of audio out line 133-pin 125-pin 180-audio in line 188; data is communicated between the accessory circuitry 170 and the controller 108 via the path of data line 190-pin 181-pin 127-data line 134, the path of data line 191-pin 182-pin 128-data line 135, and the path of data line 192-pin 184-pin 129-data line 136 according to the three-wire bus protocol utilized in radiotelephone products manufactured and sold by Motorola, Inc. or other suitable high speed data communication protocol; and the logic grounds are intercoupled via lines 193 and 137 and pins 186 and 131.

Once the accessory 104 is attached, the controller 108 measures the voltage level on the audio in line 132 (at step 202). Next, the controller 108 compares the voltage level on the audio in line 132 to voltage level ranges stored in an accessory lookup table in the memory 109 (at steps 204 and 206). The accessory lookup table also contains an accessory identity associated with each voltage level range. In particular, the controller 108 determines if the voltage level on the audio in line 132 falls within a first voltage level range defined by voltage level V1 and voltage level V2, which are preferably approximately 1.6 V and approximately 1.9 V, respectively (at step 204). If the voltage level on the audio in line 132 falls within the first voltage level range, the controller 108 identifies the accessory 104 from the accessory lookup table as a mid rate charger (at step 208).

If the voltage level on the audio in line 132 does not fall within the first voltage level range, the controller 108 determines if the voltage level on the audio in line 132 falls within a second voltage level range defined by voltage level V3 and voltage level V4, approximately 3.6 V and approximately 4.2 V, respectively (at step 206). If the voltage level on the audio in line 132 falls within the second voltage level range, the controller 108 identifies the accessory 104 from the accessory lookup table as a fast rate charger (at step 210). If the voltage level on the audio in line 132 does not fall within the second voltage level range, the controller 108 ends the method (at step 212).

The accessory lookup table is described above as only containing voltage level ranges and identities associated with two accessories. However, one skilled in the art will recognize that the accessory lookup table could be made larger to contain additional voltage level ranges and accessory identities, and that the method of FIG. 2 could be easily modified such that the controller 108 continues to traverse the larger lookup table following step 206 and prior to ending the method at step 212.

Although the aforementioned identification scheme is preferred because it eliminates the need for, and the cost of, the accessory circuitry 170, one skilled in the art will recognize that alternative ways of identifying the accessory 104 to the electronic device 102 could be employed without altering the connectors 122 and 173. For example, the mid or fast rate chargers could be implemented with a logic circuit or a microcontroller that communicates predefined identification information to the controller 108 via the data lines 190–192 and pins 182–184 upon attachment of the accessory 104.

Next, the controller 108 determines if the voltage and the temperature of the battery 103 are within a predetermined range for charging the battery 103 at a mid rate (at step 218) or a fast rate (at step 220). The controller 108 determines if a voltage level of the battery voltage supply measured on line 118 falls within a suitable charging voltage range stored in the memory 109, such as the voltage range of approximately 5.8 V to approximately 7.8 V. The controller 108 also determines if a temperature level of the battery 103 indicated by the temperature signal measured on line 119 falls within a suitable charging temperature range stored in the memory 109, such as the temperature range of approximately 5° C. to 40° C.

If the voltage level and the temperature level fall within suitable ranges, the controller 108 initiates charging of the battery 103 at the mid or fast rate by placing an enable signal on line 144 (at step 214). The enable signal drives the control switch 143 to turn on the transistor switch 142 and conduct current supplied by the external power supply at the supply terminal 114 to the electrochemical cell 160 of the battery 103 via the battery terminal 115. The current supplied by the external power supply at the mid or fast rate charges the battery 103. The controller 108 maintains the enable signal on the line 144 as long as the battery 103 remains within the voltage and temperature range at step 214 and is determined to be not fully charged (at step 218). In the illustrated embodiment, the controller 108 determines that the battery 103 is fully charged when the temperature of the battery 103 exceeds 45° C. Once the battery 103 is fully charged, the controller 108 ends the method (at step 212).

By using the AUD OUT and IN information pins 179 and 124 and audio out and in lines 187 and 132 to communicate the identity of the accessory 104 to the electronic device 102, the accessory identification system 100 remains backwards compatible with other previous accessories of the electronic device 102 that attach to the connector 122. For example, attachment of the Original Ultra Saver accessory manufactured and sold by Motorola, Inc. as model number SLN9739, to the connector 122 generates a 0 V voltage level on the audio in line 132 that is not within the voltage level ranges of the aforementioned mid and fast rate chargers. Also, attachment of the Zero Install Hands-Free Adapter accessory manufactured and sold by Motorola, Inc. as model number SLN3595, to the connector 122 generates an 8 V voltage level on the audio in line 132 that is not within the voltage level ranges of the aforementioned mid and fast rate charger accessories.

Use of the identification element 174 and the identification network 150 to identify the accessory 104 to the electronic device 102 is not limited to those accessories that do not output/receive audio to/from the electronic device 102 (i.e., the mid and fast rate chargers described above). For example, a hands-free accessory, which continually supplies microphone audio signals for the electronic device 102 via the path of audio out line 187-pin 179-pin 124-audio in line 132, could employ, for example, a 11.2 kΩ resistor as the identification element 174. The 11.2 kΩ resistor in conjunction with the identification network 150 having the 30 kΩ impedance generates a voltage level of approximately 5.7 V at the audio in line 132. The microphone audio signals generated by the hands-free accessory become modulated on the voltage level at the audio in line 132. The controller 108 filters the modulated signal to extract the audio signals for use in operating the electronic device 102 and the voltage level for use in identifying the accessory 104.

Thus, it can be seen that a power supply control apparatus and method can be implemented that permits reuse of the external power supply of an accessory, previously used only to power an electronic device, to charge a battery of the electronic device. By reusing the external power supply in this manner, the electronic device effectively operates as a mid or fast rate charger without the added cost and complexity of an internal current source circuit used by prior art electronic devices to perform charging. Also, by reusing the external power supply, a dedicated charger interface to the electronic device as well as modification of the existing accessory connector can be avoided, thereby maintaining backwards compatibility with existing accessories.

What is claimed is:

1. A power supply control apparatus for an electronic device, the apparatus comprising:

a supply terminal to provide power to the electronic device;

a battery terminal to couple to a battery;

an accessory connector to couple to an accessory, the accessory connector having a plurality of pins, one of the plurality of pins being an external power supply pin coupled to the supply terminal, the external power supply pin supplied with external power when the accessory is coupled to the accessory connector;

a switch circuit coupled to the supply terminal, the external power supply pin and the battery terminal, the switch circuit to connect the battery terminal to the supply terminal when the external power is not present on the external power supply pin so as to supply the supply terminal with a voltage level of the battery, and the switch circuit to disconnect the battery terminal from the supply terminal when the external power is present on the external power supply pin so as to supply the supply terminal with a voltage level of the external power; and a controller coupled to the switch circuit and the external power supply pin, the controller, when the external power is present on the external power supply pin, to further control the switch circuit to provide a current path between the external power supply pin and the battery terminal so as to charge the battery with a current of the external power, thereby, using the external power supply pin to provide a voltage level for powering the electronic device and provide a current for charging the battery.

2. A power supply control apparatus according to claim 1 wherein the plurality of pins further include an audio in pin, an audio out pin, an analog ground pin, at least one data pin and a logic ground pin.

3. A power supply control apparatus according to claim 1 further comprising a diode coupled between the external power supply pin and the supply terminal.

4. A power supply control apparatus according to claim 1 wherein the accessory is a mid rate charger or a fast rate charger, and the plurality of pins includes an identification pin coupled to the controller, the identification pin supplied with identification information when the accessory is coupled to the accessory connector, the identification information being a voltage level; and further comprising a memory coupled to the controller, the memory containing an accessory lookup table, the accessory lookup table including a first voltage level range associated with the mid rate charger and a second voltage level range associated with the fast rate charger.

5. A power supply control apparatus according to claim 1 wherein the voltage level of the battery is lower than the voltage level of the external power.

6. A power supply control apparatus according to claim 1 wherein the switch circuit includes a first switch, the first switch including a transistor and a diode, the transistor having first, second and third terminals, the first terminal coupled to the supply terminal and the external power supply pin, the second terminal coupled to the battery terminal, and the diode coupled between the first and second terminals.

7. A power supply control apparatus according to claim 6 wherein
the first switch is a MOSFET (metal-oxide semiconductor field effect transistor) device,
the first terminal is a drain terminal,
the second terminal is a source terminal,
the third terminal is a gate terminal, and
the diode is intrinsic to the MOSFET device.

8. A power supply control apparatus according to claim 6 wherein the switch circuit further includes a second switch to control the first switch, the second switch including a transistor coupled to the third terminal of the transistor of the first switch and the controller.

9. A power supply control apparatus according to claim 8 wherein the second switch is a BJT (bipolar junction transistor) having a collector terminal, a base terminal and an emitter terminal, the collector terminal coupled to the third terminal of the transistor of the first switch, and the base terminal coupled to the controller.

10. An electronic device comprising:
an antenna;
a receiver coupled to the antenna;
a transmitter coupled to the antenna:
a supply terminal to provide power to the electronic device;
an accessory connector to couple to an accessory, the accessory connector having a plurality of pins, only one of the plurality of pins being an external power supply pin, the external power supply pin coupled to the supply terminal, the external power supply pin supplied with external power when the accessory is coupled to the accessory connector;
a battery terminal to couple to a battery;
a switch circuit coupled to the supply terminal, the external power supply pin and the battery terminal, the switch circuit to connect the supply terminal to the battery terminal when the external power is not present on the external power supply pin so as to supply the supply terminal with a voltage level of the battery, and the switch circuit to disconnect the supply terminal from the battery terminal when the external power is present on the external power supply pin so as to supply the supply terminal with a voltage level of the external supply, the voltage level of the external supply greater than the voltage level of the battery; and
a controller coupled to the receiver, the transmitter, the battery terminal, the external power supply pin and the switch circuit, the controller, when the external power is present on the external power supply pin, to further control the switch circuit to provide a current path between the external power supply pin and the battery terminal so as to charge the battery with a current of the external power, thereby, using the external power supply pin to provide a voltage level for powering the electronic the electronic device and provide a current for charging the battery.

11. An electronic device according to claim 10 wherein the switch circuit includes first and second transistors and a diode, the first transistor having first, second and third terminals, the first terminal coupled to the supply terminal and the external power supply pin, the second terminal coupled to the battery terminal, the second transistor coupled to the third terminal and the controller, and the diode coupled across the first and second terminals.

12. An electronic device according to claim 10 further comprising a diode coupled between the external power supply pin and the supply terminal.

13. An electronic device according to claim 10 wherein
the accessory is a mid rate charger or a fast rate charger, and
the plurality of pins includes an identification pin coupled to the controller, the identification pin supplied with identification information when the accessory is coupled to the accessory connector, the identification information being a voltage level; and
further comprising a memory coupled to the controller, the memory containing an accessory lookup table, the accessory lookup table including a first voltage level range associated with the mid rate charger and a second voltage level range associated with the fast rate charger.

14. An electronic device according to claim 10 wherein the switch circuit includes a MOSFET (metal-oxide semiconductor field effect transistor) device, the MOSFET device having gate, drain and source terminals and an intrinsic diode, the gate and drain terminals coupled to the supply terminal and the external power supply pin, the source terminal coupled to the battery terminal, and the diode coupled across the drain and source terminals.

15. An electronic device according to claim 14 wherein the switch circuit further includes a BJT (bipolar junction transistor) having a collector terminal, a base terminal and an emitter terminal, the collector terminal coupled to the gate terminal of the MOSFET, and the base terminal coupled to the controller.

16. A power supply control method for an electronic device having a battery terminal and an accessory connector, the method comprising the steps of:
detecting attachment of a battery to the battery terminal;
powering the electronic device from a voltage level of the battery;
detecting attachment of an accessory to the accessory connector from the presence of external power supplied by the accessory on an external power supply pin of the accessory connector;
powering the electronic device from a voltage level of the external power on the external power supply pin;
halting powering of the electronic device from the voltage level of the battery;
coupling current of the external power on the external power supply pin to the battery terminal for charging of the battery.

17. A power supply control method according to claim 16 wherein the step of coupling comprises the step of:
coupling a mid rate charging current of the external power on the external power supply pin to the battery terminal.

18. A power supply control method according to claim 16 wherein the step of coupling comprises the step of:
coupling a fast rate charging current of the external power on the external power supply pin to the battery terminal.

19. A power supply control method according to claim 16 further comprising the steps of:

determining if a voltage level of the battery is within a predetermined voltage range; and determining if a temperature level of the battery is within a predetermined temperature range.

20. A power supply control method according to claim 16 further comprising the steps of:

reading a voltage level from an identification pin of the accessory connector, the identification pin supplied with identification information when the accessory is coupled to the accessory connector;

accessing an accessory lookup table stored in a memory, the accessory lookup table including a first voltage level range associated with a mid rate charger and a second voltage level range associated with a fast rate charger;

determining if the voltage level read from the identification pin falls within the first voltage range;

identifying, when the voltage level read from the identification pin falls within the first voltage range, the accessory as a mid rate charger;

determining, when the voltage level read from the identification pin does not fall within the first voltage range, if the voltage level read from the identification pin falls within the second voltage range; and identifying, when the voltage level read from the identification pin falls within the second voltage range, the accessory as a fast rate charger.

* * * * *

UNITED STATES PATENT AND TRADEMARK OFFICE
CERTIFICATE OF CORRECTION

PATENT NO. : 5,925,942
DATED : July 20, 1999
INVENTOR(S) : Theobald, David J.

It is certified that error appears in the above-indentified patent and that said Letters Patent is hereby corrected as shown below:

<u>Claim 10</u>

At lines 63-64 of claim 10, please delete the first occurrence of the phrase "the electronic".

Signed and Sealed this

Fifteenth Day of February, 2000

Attest:

Attesting Officer

Q. TODD DICKINSON

Commissioner of Patents and Trademarks